United States Patent [19]

Kato

[11] 3,755,315

[45] Aug. 28, 1973

[54] 2-H-PYRIDO(2,3-A)PYRAZINE DERIVATIVES AND THEIR ACID-ADDITION SALTS

[75] Inventor: Hideo Kato, Motomachi, Japan

[73] Assignee: Hokuriku Seiyaku Co., Ltd., Fukui, Japan

[22] Filed: Aug. 5, 1970

[21] Appl. No.: 61,422

[52] U.S. Cl.... 260/243 A, 260/268 TR, 260/268 R, 424/247, 424/250
[51] Int. Cl. ...................... C07d 51/72, C07d 94/13
[58] Field of Search...................... 260/243, 268 BL, 260/268

[56] References Cited
UNITED STATES PATENTS

| | | | |
|---|---|---|---|
| 2,902,485 | 9/1959 | Horclois | 260/243 |
| 2,898,336 | 8/1959 | Gailliot et al. | 260/243 |
| 2,905,668 | 9/1959 | Jacob et al. | 260/243 |
| 2,979,502 | 4/1961 | Gailliot et al. | 260/243 |

OTHER PUBLICATIONS

Freed et al., J. Org. Chem., Vol. 25, p. 2108–2113, (1960).

*Primary Examiner*—Harry I. Moatz
*Attorney*—Milton J. Wayne

[57] ABSTRACT

The present invention provides new 2-azaquinolizidine derivatives and their acid-addition salts, which have neurotropic and antihistaminic effects and are valuable as medicaments, as well as a process for the production of these compounds.

9 Claims, No Drawings

2-H-PYRIDO(2,3-A)PYRAZINE DERIVATIVES AND THEIR ACID-ADDITION SALTS

DETAILED EXPLANATION OF INVENTION

The present invention relates to new 2-azaquinolizidine derivatives of the general formula

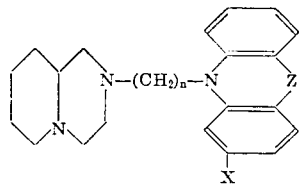

wherein X represents hydrogen atom, a halogen atom, a halogenomethyl group or methoxy group, Z represents sulfur atom or a radical — CH = CH — or —CH$_2$ — CH$_2$ —, and n is an integer of 1 - 5, and their acid-addition salts, as well as a process for the production of these compounds.

The 2-azaquinolizidine derivatives and their acid-addition salts are all new substances which have never been described in the literature. These compounds have antihistaminic effects and accordingly are valuable as medicaments.

The process of this invention is represented by the following equation:

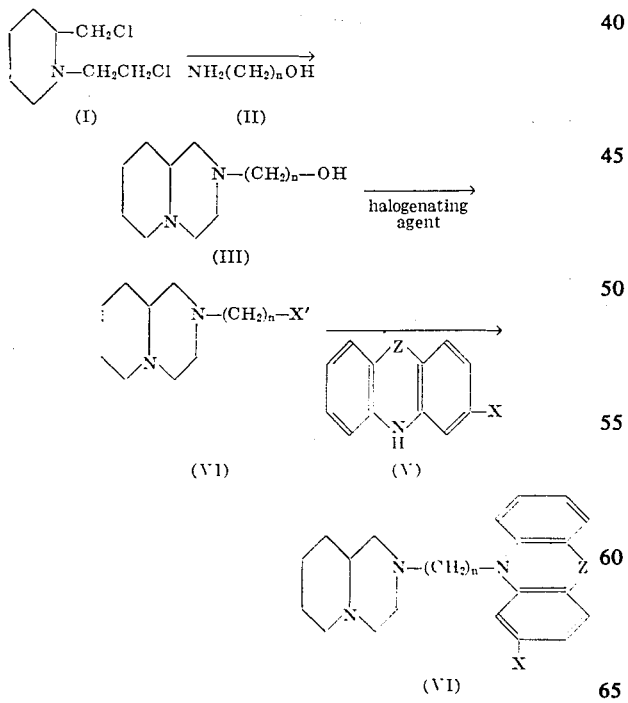

wherein X, Z and n have the same meanings as above, and X' represents a halogen atom.

Namely, the process comprises the following three steps:

1. the step of reacting 1-($\beta$-chloroethyl)-2-chloromethylpiperidine of the formula (I) with a hydroxy-alkylamine of the general formula (II) to form a 2hydroxyalkyl2-azaquinolizidine of the general formula (III), 2. the step of halogenating a 2-hydroxyalkyl-2-azaquinolizidine of the general formula (III) in its hydroxyl group to form a 2-halogenoalkyl-2-azaquinolizidine of the general formula (IV), and 3. the step of condensing a 2-halogenoalkyl-2-azaquinolizidine of the general formula (IV) with a phenothiazine derivative or a 5H-dibenzo(b,f-azepine derivative of the general formula (V) to form a 2-azaquinolizidine derivative of the general formula (VI).

In the step (1), 1-($\beta$-chloroethyl)-2-chloromethylpiperidine is reacted with for example monoethanolamine or 3-amino-1-propanol in the presence of a de-hydrogen halogenide agent such as potassium carbonate, sodium acetate, pyridine or a tertiary amine. The reaction may be carried out without any solvent or in a solvent, for example, in an organic solvent such as acetone, chloroform, benzene, toluene, etc.

In the step (2), the 2-($\beta$-hydroxyethyl)-2-azaquinolizidine or 2-($\gamma$-hydroxypropyl)-2-azaquinolizidine so obtained is halogenated in a conventional manner, using a halogenating agent such as thionyl chloride, etc. This reaction too may be carried out without any solvent or in a solvent such as chloroform, dichloromethane, etc.

In the step (3), the resulting halogenated compound, i.e. a 2-halogenoalkyl-2-azaquinolizidine is condensed with a phenothiazine derivative or a 5H-dibenzo(b,f)-azepine derivative of the general formula (V) in an organic solvent such as benzene, toluene, xylene, etc. in the presence of a condensing agent such as sodium amide, sodium hydride, metallic sodium or the like. The condensation reaction is suitably carried out at room temperature or at the boiling point of the solvent used.

Compounds of the above general formula (VI) can be converted into their salts according to a conventional method. As acids suitable for the salt formation, there can be mentioned inorganic and organic acids which yield pharmaceutically acceptable salts, such as hydrochloric acid, hydrobromic acid, phosphoric acid, sulfuric acid, acetic acid, lactic acid, salicylic acid, benzoic acid, tartaric acid, maleic acid, gallic acid, methanesulfonic acid, etc.

The invention is further illustrated by the following examples:

EXAMPLE 1

2-($\gamma$-hydroxypropyl)-2-azaquinolizidine and its hydrochloride 20.8 grams of 1-($\beta$-chloroethyl)-2-chloromethylpiperidine and 21.5g of triethylamine are dissolved in 100ml of chloroform. To the solution obtained, a solution of 8.7g of 3-amino-1-propanol in 60ml of chloroform is added dropwise. The mixture is refluxed for 18 hours and then concentrated under reduced pressure. The resulting residue is made alkaline with an aqueous sodium hydroxide solution, and the base precipitated is extracted with chloroform. The chloroform extract is dried over anhydrous sodium sulfate and, after distilling off the chloroform, distilled under vacuum to give a basic compound having a boiling point of 125° – 128°C/2mmHg.

The base is dissolved in anhydrous ethanol and made acidic with ethanolic hydrogen chloride. The crystals precipitated are separated by filtration and recrystalized from anhydrous ethanol, whereby pure crystals having a melting point of 232° – 236°C are obtained.

Analysis for $C_{11}H_{24}N_2OCl_2$
Calculated: C, 48.71; H, 8.93; N, 10.33
Found : C, 48.69; H, 9.07; N, 10.12

EXAMPLE 2

2-($\beta$-hydroxyethyl)-2-azaquinolizidine

To the solution obtained by dissolving 12.8g of 1-($\beta$-chloroethyl)-2-chloromethylpiperidine and 13.2g of triethylamine in 80ml of chloroform, a solution of 4.4g of monoethanolamine in 40ml of chloroform is added dropwise. The mixture is refluxed for 18 hours and then treated in the same manner as in Example 1, whereby 2-($\beta$-hydroxyethyl)-2-azaquinolizidine having a boiling point of 100° – 103°C/2mmHg is obtained.

EXAMPLE 3

2-( $\gamma$ -chloropropyl)-2-azaquinolizidine

Eight grams of 2-( $\gamma$ -hydroxypropyl)-2-azaquinolizidine obtained in Example 1 are dissolved in 100ml of dichloromethane. To the resulting solution, a solution of 17g of thionyl chloride in 80ml of dichloromethane is added dropwise. The mixture is refluxed for 3 hours and then evaporated under reduced pressure. The residue is dissolved in ice-water and made alkaline with an aqueous sodium hydroxide solution. The base precipitated is taken in ether and the ether extract is dried, distilled off the ether, and distilled under vacuum to give 2-( $\gamma$ -chloropropyl)-2-azaquinolizidine having a boiling point of 129° – 133°C/5mmHg. The hydrochloride has a melting point of 235° – 237°C.

Analysis for $C_{11}H_{23}N_2Cl_3$
Calculated: C, 45.60; H, 8.00; N, 9.67
Found : C, 44.89; H, 8.12; N, 9.60

EXAMPLE 4

2-( $\beta$ -chloroethyl)-2-azaquinolizidine 4 grams of 2-( $\beta$ -hydroxyethyl)-2-azaquinolizidine obtained in Example 2 are dissolved in 50ml of dichloromethane. To the resulting solution, a solution of 9g of thionyl chloride in 40ml of dichloromethane is added dropwise. The mixture is refluxed for 3 hours and then a small amount of water is added thereto dropwise. The whole is made alkaline by adding an aqueous sodium hydroxide solution dropwise, and then the base is taken in dichloromethane. The dichloromethane extract is dried, distilled off the dichloromethane, and distilled under vacuum to give 2-( $\beta$ -chloroethyl)-2-azaquinolizidine having a boiling point of 99° – 101°C/3mmHg.

EXAMPLE 5

10-[$\gamma$-{2-(2-azaquinolizidyl)}-propyl]-phenothiazine

To a suspension of 2.8g of phenothiazine in 25ml of xylene, 0.6g of sodium amide is added and the mixture is refluxed for 3 hours. After addition of a solution of 3.4g of 2-($\gamma$-chloropropyl)-2-azaquinolizidine obtained in Example 3 in 15ml of xylene, the whole is further refluxed for 5 hours and thereafter extracted with 1.5N-hydrochloric acid. The aqueous layer is washed with ether and made alkaline with sodium hydroxide. The base precipitated is taken in ether. The ether solution is dried, distilled off the ether, and distilled under vacuum to give 10-[$\gamma$- {2-(2-azaquinolizidyl)}-propyl]-phenothiazine having a boiling point of 230° – 235°C/1.5mmHg. The hydrochloride has a melting point of 195° – 196°C.

Analysis for $C_{23}H_{31}N_3SCl_2$
Calculated: C, 61.02; H, 6.85; N, 9.31
Found: C, 60.83; H, 7.12; N, 9.26

EXAMPLE 6

10-[$\beta$-{2-(2-azaquinolizidyl)}-ethyl]-phenothiazine 0.64 gram of sodium amide is added to a suspension of 2.9g of phenothiazine in 25ml of xylene, and the mixture is refluxed for 3 hours. Then a solution in 15ml of xylene of 3.3g of 2-($\beta$-chloroethyl)-2-azaquinolizidine obtained in Example 4 is added dropwise, and the whole is further refluxed for 5 hours, washed with water, and extracted with 1.5N-hydrochloric acid. The acidic extract is made alkaline with sodium hydroxide. The base so precipitated is taken in ether, and the ether solution is dried, distilled off the ether, and distilled under vacuum to give 10-[$\beta$-{2-(2-azaquinolizidyl)}-ethyl]-phenothiazine having a boiling point of 225° – 227°C/1.3mmHg. The hydrobromide has a melting point of 189° – 191.5°C, and the picrate a melting point of 236°–239°C.

Analysis for $C_{22}H_{27}N_3S.2(NO_2)_3C_6H_2OH$
Calculated: C, 49.57; H, 4.04; N, 15.30
Found: C, 49.21; H, 4.15; N, 15.04

EXAMPLE 7

10-[$\gamma$- {2-(2-azaquinolizidyl)}-propyl]-2-chlorophenothiazine 1.35 grams of sodium amide are added to a suspension of 7.3g of 2-chlorophenothiazine in 60ml of xylene, and the mixture is refluxed for 3 hours. After a solution in 30ml of xylene of 7.5g of 2-($\gamma$-chloropropyl)-2-azaquinolizidine obtained in Example 3 is added dropwise, the whole is further refluxed for 5 hours and then washed with water and extracted with 1.5N-hydrochloric acid. The acidic extract is made alkaline with sodium hydroxide and the base precipitated is taken in ether. The ether solution is dried, distilled off the ether, and distilled under vacuum to give 10-[$\gamma$-{2-(2-azaquinolizidyl)}-propyl]-2-chlorophenothiazine having a boiling point of 234° – 236°C/1.5mmHg. The hydrochloride has a melting point of 195° – 197°C.

Analysis for $C_{23}H_{30}N_3SCl_3$
Calculated: C, 56.73; H, 6.21; N, 8.63
Found: C, 56.41; H, 6.50; N, 8.35

EXAMPLE 8

10-[$\beta$-{2-(2-azaquinolizidyl)}-ethyl]-2-chlorophenothiazine 0.44 gram of sodium amide is added to a suspension in 30ml of toluene of 2.38g of 2-chlorophenothiazine, and the mixture is refluxed for 3 hours. After a solution in 20ml of toluene of 2.3g of 2-($\beta$-chloroethyl)-2-azaquinolizidine obtained in Example 4 is added dropwise, the whole is further refluxed for 5 hours and then washed with water and extracted with 1.5N-hydrochloric acid. The acidic extract is made alkaline with sodium hydroxide, and the base precipitated is taken in ether. The ether solution is dried, distilled off the ether, and distilled under vacuum to give 10-[β-{2-(2-azaquinolizidyl)}-ethyl]-2-chlorophenothiazine having a boiling point of 225° – 228°C/1.4mmHg. The picrate has a melting point of 235° – 236.2°C.

Analysis for $C_{22}H_{26}N_3SCl \cdot 2(NO_2)_3C_6H_2OH$
Calculated: C, 47.58; H, 3.76; N, 14.69
Found: C, 47.43; H, 3.89; N, 14.37

EXAMPLE 9

5-[β-{2-2-azaquinolizidyl)}-ethyl]-10,11-dihydro-5H-dibenzo-(b,f)-azepine and its hydrochloride 0.25 gram of sodium amide and 1.25g of 10,11-dihydro-5H-dibenzo-(b,f)-azepine are added to 20ml of anhydrous xylene and the mixture is refluxed for 3 hours. After a solution of 1.3g of 2-(β-chloroethyl)-2-azaquinolizidine in 10ml of anhydrous xylene is added dropwise, the whole is further refluxed for 7 hours and, after cooling, extracted with 1.5N-hydrochloric acid. The aqueous layer is made alkaline with sodium hydroxide, and the base is taken in ether. The ether layer is washed with water, dried, distilled off the ether, and distilled under vacuum to give the final product.

The base thus obtained is dissolved in anhydrous ether and acidified with ethereal hydrogen chloride. The crystals precipitated are separated by filtration and recrystallized from anhydrous ethanol, whereby pure hydrochloride having a melting point of 204.5° – 206°C is obtained.

Analysis for $C_{24}H_{31}N_3 \cdot 2HCl \cdot H_2O$
Calculated: C, 63.71; H, 7.80; N, 9.29
Found: C, 63.97; H, 7.87; N, 8.93

EXAMPLE 10

5-[γ-{2-(2-azaquinolizidyl)}-propyl]-10,11-dihydro-5H-dibenzo-(b,f)-azepine and its hydrochloride 0.26 gram of sodium amide and 1.3g of 10,11-dihydro-5H-dibenzo-(b,f)-azepine are added to 20ml of anhydrous xylene, and the mixture is refluxed for 3 hours. After a solution in 10ml of anhydrous xylene of 1.45g of 2-(γ-chloropropyl)-2-azaquinolizidine is added dropwise, the whole is refluxed for further 7 hours. By the same after-treatment as in Example 9, the aimed base is obtained from the reaction mixture. The base is dissolved in anhydrous ether and acidified with ethereal hydrogen chloride. The crystals precipitated are separated by filtration and recrystallized from anhydrous ethanol whereby pure crystals having a melting point of 212° – 213.8°C are obtained.

Analysis for $C_{25}H_{33}N_3 \cdot 2HCl \cdot H_2O$
Calculated: C, 64.37; H, 7.99; N, 9.01
Found: C, 64.12; H, 8.16; N, 9.07

EXAMPLE 11

5-[β-{2-(2-azaquinolizidyl)}-ethyl]-5H-dibenzo-(b,f)-azepine and its hydrobromide 0.59 gram of sodium amide and 2.9g of 5H-dibenzo-(b,f)-azepine are added to 50ml of anhydrous xylene, and the mixture is refluxed for 3 hours. After a solution in 25ml of anhydrous xylene of 3g of 2-(β-chloroethyl)-2-azaquinolizidine is added dropwise, the whole is refluxed for further 7 hours. After the same after-treatment as in Example 9, the final base is obtained.

The base is dissolved in anhydrous ether and acidified with ethereal hydrogen bromide. The crystals precipitated are separated by filtration and recrystallized from anhydrous ethanol whereby pure crystals having a melting point of 221° – 223°C are obtained.

Analysis for $C_{24}H_{29}N_3 \cdot 2HBr \cdot H_2O$
Calculated: C, 53.45; H, 6.17; N, 7.79
Found: C, 53.31; H, 6.35; N, 7.80

What is claimed is:

1. A compound of the formula

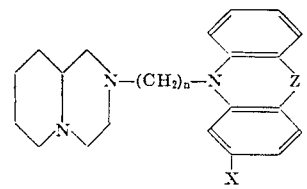

wherein
X is a member selected from the group consisting of a hydrogen atom, and a halogen atom,
Z is a member selected from the group consisting of a sulfur atom, a —CH=CH— group and a —CH₂—CH₂— group, and
n is an integer of 1 to 5 and the pharmaceutically acceptable acid addition salts thereof.

2. A compound according to claim 1 wherein n is an integer of 2 or 3

3. A compound according to claim 1 which is 10-[γ-2-{(2H-pyrido(2,3-a)pyrazine}-propyl]-phenothiazine and pharmaceutically acceptable acid addition salts thereof.

4. A compound according to claim 1 which is 10[β-{2-(2H-pyrido(2,3-a)pyrazine}-ethyl]-phenothiazine and pharmaceutically acceptable acid addition salts thereof.

5. A compound according to claim 1 which is 10-[γ-{2-(2H-pyrido(2,3-a)pyrazine}-propyl]-2-chlorophenothiazine and pharmaceutically acceptable acid addition salts thereof.

6. A compound according to claim 1 which is 10-[β-{2-(2H-pyrido(2,3-a)pyrazine}-ethyl]-2-chlorophenothiazine and pharmaceutically acceptable acid addition salts thereof.

7. A compound according to claim 1 which is 5-[β-{2-(2H-pyrido(2,3-a)pyrazine}-ethyl]-10,11-dihydro-5H-dibenzo-(b,f)-azepine and pharmaceutically acceptable acid addition salts thereof.

8. A compound according to claim 1 which is 5-[γ-{2-(2H-pyrido(2,3-a)pyrazine}-propyl]-10,11-dihydro-5H-dibenzo-(b,f)-azepine and pharmaceutically acceptable acid addition salts thereof.

9. A compound according to claim 1 which is 5-[β-{2-(2H-pyrido(2,3-a)pyrazine}-ethyl]-5H-dibenzo-(b,f)-azepine and pharmaceutically acceptable acid addition salts thereof.

* * * * *